(12) United States Patent
Ryan et al.

(10) Patent No.: US 6,995,227 B2
(45) Date of Patent: Feb. 7, 2006

(54) ACTIVATOR COMPOSITIONS FOR CYANOACRYLATE ADHESIVES

(75) Inventors: Bernard Ryan, Dublin (IE); Hanns Roland Misiak, Dublin (IE); James A. Houlihan, Dublin (IE); Gerard R. McCann, Dublin (IE)

(73) Assignee: Loctite R&D Limited, Dublin (IE)

( * ) Notice: Subject to any disclaimer, the term of this patent is extended or adjusted under 35 U.S.C. 154(b) by 0 days.

(21) Appl. No.: 10/276,287

(22) PCT Filed: May 11, 2001

(86) PCT No.: PCT/IE01/00063

§ 371 (c)(1),
(2), (4) Date: Mar. 31, 2003

(87) PCT Pub. No.: WO01/85861

PCT Pub. Date: Nov. 15, 2001

(65) Prior Publication Data

US 2003/0191248 A1 Oct. 9, 2003

(30) Foreign Application Priority Data

| May 12, 2000 | (IE) | ............................................ 20000367 |
| Apr. 27, 2001 | (IE) | ............................................ 20010422 |

(51) Int. Cl.
*C08F 3/42* (2006.01)

(52) U.S. Cl. .................... 526/297; 260/33.4; 260/33.64; 260/78.4; 106/287; 526/318

(58) Field of Classification Search ................. 526/297, 526/318; 260/33.4, 33.64, 78.4; 106/287
See application file for complete search history.

(56) References Cited

U.S. PATENT DOCUMENTS

| 3,254,111 | A |   | 5/1966 | Hawkins et al. ......... 260/465.4 |
| 3,654,340 | A |   | 4/1972 | Banitt ...................... 260/465.4 |
| 3,836,377 | A | * | 9/1974 | Delahunty ................... 526/205 |
| 3,869,435 | A | * | 3/1975 | Trivette, Jr. .................. 525/341 |
| 4,695,615 | A |   | 9/1987 | Leonard et al. ............. 526/194 |
| 4,869,772 | A |   | 9/1989 | McDonnell et al. ......... 156/314 |
| 5,314,562 | A |   | 5/1994 | McDonnell et al. ......... 156/314 |
| 5,749,956 | A |   | 5/1998 | Fisher et al. ........... 106/287.28 |

FOREIGN PATENT DOCUMENTS

| DE | 27 8033 | 4/1990 |
| EP | 0 151 521 A2 | 1/1985 |
| EP | 0 259 016 A1 | 8/1987 |
| EP | 0 271 675 A2 | 10/1987 |
| GB | 1 230 560 A | 5/1971 |
| JP | 62 01 8485 | 4/1987 |
| WO | WO 82/00829 | 3/1982 |
| WO | WO 83/02450 | 7/1983 |
| WO | WO 00/39229 | 7/2000 |

* cited by examiner

Primary Examiner—William K. Cheung
(74) Attorney, Agent, or Firm—Steven C. Bauman

(57) ABSTRACT

An activator composition for the accelerated hardening of cyanoacrylate adhesives, wherein the activator comprises a member selected from the group consisting of: aromatic heterocyclic compounds having at least one N hetero atom in the ring(s) such as pyridines, quinolines and pyrimidines and substituted on the ring(s) with at least one electron-withdrawing group which decreases the base strength of the substituted compound compared to the corresponding unsubstituted compound, mixtures of any of the foregoing with each other, and/or with N,N-dimethyl-p-toluidine, and mixtures of any of the foregoing and/or N,N-dimethyl-p-toluidine with an organic compound containing the structural element, —N=C—S—S—, such as dibenzothiazyl disulfide. 6,6'dithiodinicotinic acid, 2,2'-dipyridyl disulfide, and bis(4-t-butyl-1-isopropyl-2-imidazolyl)disulfide. An activator composition may comprise a solution of one or more activators in a solvent mixture which comprises a volatile hydrocarbon and a cyclic ketone.

47 Claims, No Drawings

ACTIVATOR COMPOSITIONS FOR CYANOACRYLATE ADHESIVES

FIELD OF THE INVENTION

This invention relates to activator compositions, particularly well suited for accelerating the hardening of cyanoacrylate adhesives. The invention also relates to novel mixtures of chemical compounds and to the use of the activator compositions and the novel mixtures for the accelerated hardening of cyanoacrylate adhesives. The invention further relates to a process for the accelerated bonding of substrates using cyanoacrylate adhesives.

BRIEF DESCRIPTION OF RELATED TECHNOLOGY

Adhesive compositions based upon cyanoacrylate esters are well known and have found extensive use, because of their rapid cure speed, excellent long-term bond strength, and applicability to a wide variety of substrates. They generally harden after only a few seconds, after which the joined parts exhibit at least a certain degree of initial strength.

It is known that certain cyanoacrylate (CA) adhesives typically harden by an anionic polymerisation reaction. If the adhesive is conventionally applied in a relatively thick layer in the joint gap or relatively large amounts of adhesive are applied so that relatively large drops of adhesive protrude from between the parts to be joined, rapid hardening throughout the adhesive may rarely be achieved, i.e. cure-through-gap or cure-through-volume (CTV) performance may be unsatisfactory.

With certain substrates, particularly substrates having acidic surfaces, such as wood or paper, the polymerisation reaction may be retarded, oftentimes to an unmanageable extent. Moreover, unless the adhesive is gelled or rendered thixotropic by appropriate additives to confer such properties, the wood or paper substrates, due to their porosity, tend to draw the adhesive out of the joint gap by capillary action before hardening has taken place in the gap.

Heretofore efforts have been made to accelerate the polymerisation of such CA adhesives by means of certain additives. Addition of accelerators directly to the adhesive formulation is possible to only a very limited extent, however, since substances having a basic or nucleophilic action, which would normally bring about a pronounced acceleration of the polymerisation of the cyanoacrylate adhesive, are generally used at the expense of the storage stability of such formulations.

Addition of such accelerators shortly before application of the adhesive results in virtually a two-component system. However, such method has the disadvantage that the working life is limited after the activator has been mixed in. In addition, with the small amounts of activator that are required, the necessary accuracy of metering and homogeneity of mixing are difficult to achieve. Moreover, use of such a two-component system is often seen as cumbersome to the end user, and sometimes only modestly improves the intended result.

Activators are also used in the form of a dilute solution which is either applied beforehand onto a substrate or part which is to be bonded, and/or is applied onto the adhesive where it is still liquid after the substrates have been joined. The solvents used for such dilute solutions of activators are generally low-boiling organic solvents, so that they may be readily evaporated, leaving the activator on the substrate/part or the adhesive.

Japanese Patent Application No. JP-A-62 022 877 proposes the use of solutions of lower fatty amines, aromatic amines, dimethylamine and the like. Japanese Patent Application No. JP-A-03 207 778 proposes the use of solutions of aliphatic, alicyclic and, especially, tertiary aromatic amines; particular examples which are mentioned are N,N-dimethylbenzylamine, N-methylmorpholine and N,N-diethyltoluidine.

Japanese Patent Application No. 59-66471 discloses a hardening accelerator for use with cyanoacrylate adhesives comprising an amine compound, with a boiling point of between 50° C. and 250° C., together with a deodorizer and a solvent. Examples of suitable amines are triethyl amine, diethyl amine, butyl amine, isopropyl amine, tributyl amine, N,N-dimethyl aniline, N,N-diethyl aniline, N,N-dimethyl-p-toluidine, N,N-dimethyl-m-toluidine N,N-dimethyl-o-toluidine, dimethyl benzyl amine, pyridine, picoline, vinyl pyridine, ethanolamine, propanolamine and ethylene diamine.

U.S. Pat. No. 3,260,637 of von Bramer discloses the use of a range of organic amines (excluding primary amines) as accelerators for cyanoacrylate adhesives, particularly for use on metallic and non-metallic substrates.

N,N-dimethyl-p-toluidine has been widely used as an accelerator for the accelerated hardening of cyanoacrylate adhesives. A crucial disadvantage of the use of that substance is the short duration of the surface activation, which does not permit long waiting times between application of the accelerator solution beforehand to the substrates to be bonded and the subsequent bonding process. In addition, the use of N,N-dimethyl-p-toluidine in some countries oftentimes involves rigorous regulatory labelling requirements.

Basicity of an accelerator substance is not a sufficient criterion for identifying solutions which are acceptable in practice in terms of application technology. Many substances, such as alkylamines, 1,2-di-(4-pyridyl-ethane), 4,4'-dipyridyl disulfide, 3-(3-hydroxypropyl)pyridine, 1,2-bis(diphenylphosphino)-ethane, pyridazine, methylpyridazine or 4,4'-dipyridyl, are so basic or nucleophilic that spontaneous superficial hardening takes place at the adhesive interface (shock hardening) before the activator is able to initiate polymerisation throughout the liquid adhesive layer by convection and diffusion. The result is that an often cloudy polymerisation occurs at the surface only. With other compounds, such as oxazoles, the basicity is evidently too low, and the hardening is often too slow for practical purposes.

German Patent DE-A-22 61 261 proposes accelerator substances containing the structural element —N=C—S—, including 2,4-dimethylthiazole. However, that compound has a very high volatility, so that activator solutions based thereon are unsuitable for application beforehand since the active ingredient also evaporates off with the solvent.

It is desired to find new activator compositions for use with cyanoacrylate adhesives, which activator compositions have a pronounced accelerating action and low volatility, so that application beforehand is also possible. It is also desired to find activators which are subject to regulatory labelling requirements less rigorous than is N,N-dimethyl-p-toluidine currently.

European Patent Specification No. 0 271 675 A2 of Three Bond Co. Ltd. describes a primer for CA resin compositions for use in bonding non-polar or highly crystallized resins such as polyolefins, polyethyleneterephthalates, nylons, fluorine-containing resins, soft PVC films etc. The primer comprises (A) a compound selected from the group consisting of benzene ring compounds having aldehyde group and nitrogen or oxygen atom-containing heterocyclic compounds having aldehyde group, and (B) an organic amine compound. Nitrogen-atom containing heterocyclic compounds having aldehyde group in the component (A) include 2-pyridine carboxylaldehyde, 2,6-pyridine carboxylaldehyde and pyrrole 2-carboxylaldehyde. The specification states that in bonding non-polar or highly crystallized resins using a CA adhesive the primer instantaneously exhibits a high bonding strength at ambient temperature by a simple procedure which comprises applying such primer onto a surface of one of the resins, applying the CA adhesive onto a surface of the other resin and bringing both the surfaces into contact with each other. The Three Bond specification is directed to priming the surfaces of substrates which are difficult to bond. As described, the surfaces of the two substrates are brought into contact with one another (i.e. with "zero gap") and a high bonding strength is achieved instantaneously. The Three Bond specification is not concerned with an activator which is able to initiate polymerisation throughout a layer of adhesive (e.g. in a joint gap) by convection and diffusion without spontaneous superficial hardening taking place at the adhesive/substrate interface. In other words, the Three Bond specification is not directed to good CTV performance. A good CTV initiator should be a sufficiently slow initiator to allow effective initial mixing of the activator through the adhesive prior to polymerisation.

British Patent Specification No. 1 230 560 of International Chemical Company Limited (ICC) describes CA adhesive compositions containing certain substituted heterocyclic compounds as accelerators. The compositions may be presented in a two-part form, the first part comprising the CA adhesive and the second part comprising at least one of the substituted heterocyclic compounds, preferably in solution in an organic solvent. In the compositions in which the heterocyclic compound is an iminoethylene-substituted triazine or pyrimido-pyrimidine, the heterocyclic compound is invariably present in one part of a two-part composition because iminoethylene-substituted triazines and pyrimidoypyrimidines accelerate the polymerisation so rapidly they must be kept apart from the CA composition before use. In example 1 of the ICC specification triallylcyanurate as accelerator is mixed with the CA monomer and there is no suggestion that it or other accelerators (apart from the iminoethylene-substituted triazines and pyrimido-pyrimidines) need to be presented in a two-part form. In example 2, triethylanemelamine as a 1% solution in acetone is used as a primer on two steel surfaces, after which the monomer-containing composition is applied onto the primed surfaces and the surfaces are placed in mutual contact (i.e. with "zero gap"). An effective adhesive bond is obtained. However the ICC Specification, like the Three Bond Specification discussed above, is not concerned with an activator which is able to initiate polymerisation throughout a layer of adhesive (e.g. in a joint gap).

Japanese Patent Abstract Publication No. 62018485 of Alpha Giken KK also describes a primer for a CA adhesive and is not concerned with an activator for good CTV performance.

Notwithstanding the state-of-the-art, it would be desirable to provide further activator substances and combinations of activator substances with different properties from the activator substances used up to now. It is particularly desirable to use a mixture of activators in order to obtain a combination of properties, some at least of which would not be expected.

Activator solutions are often applied by spraying. However there is a demand for activator solutions which can be applied in excess volumes (e.g. as drops) onto an adhesive already present on a substrate (e.g. in the form of a bead or fillet).

Aliphatic hydrocarbons such as heptane are often used as the solvent for CA activators. However if the activator solution is applied onto a bead or fillet of CA adhesive which is already on a substrate ("post-application"), particularly if the solution is applied in excess volumes, a white "halo" may be formed on the substrate around the adhesive bead in the course of curing. Although the present invention is not limited by any theory, it is thought that the solvent heptane, which is substantially insoluble in the CA adhesive composition, dissolves small amounts of CA monomer and that some of the heptane phase (i.e. the activator solution with traces of CA monomer dissolved therein) runs off the adhesive bead onto the substrate. The traces of CA monomer then polymerise, and after evaporation of the solvent a thin layer of whitish amorphous material is left on the substrate around the adhesive bead, creating a "halo". This is visually unattractive and is undesirable, particularly when the substrate is of a dark colour, such as black or dark shades of colours such as blue, red, brown or green, as well as transparent substrates like glass or polycarbonate, on or through which a whitish layer would be clearly visible.

While it may be possible to use a solvent which is miscible with the CA adhesive composition, so that the solvent would mix with the adhesive, a miscible solvent would likely make the adhesive composition undesirably soft and bulky. In addition the solvent in the adhesive composition would likely take a longer time to evaporate than n-heptane which remains as a separate phase. Miscible solvents such as acetone, ethyl acetate or acetylacetone also have a stronger odour than n-heptane, and they would be unappealing to the end user. If one or both substrates is of plastics materials, a solvent which is miscible in the adhesive composition (such as acetone, toluene etc.) would also likely attack the plastics material.

One aspect of the invention according to the present application reduces the problem of the "halo" effect and provides activator solutions with different properties from the activator solutions used to date.

SUMMARY OF THE INVENTION

According to one aspect, the present invention provides a composition comprising a mixture of:

(A) a member selected from the group consisting of:

aromatic heterocyclic compounds having at least one N hetero atom in the ring(s) and substituted on the ring(s) with at least one electron-withdrawing group which decreases the base strength of the substituted compound compared to the corresponding unsubstituted compound, N,N-dimethyl-p-toluidine, and mixtures of any of the foregoing, with (B) an organic compound containing the structural element, —N=C—S—S—.

According to another aspect, the present invention provides a composition comprising a mixture of:

(A) a member selected from the group consisting of:

aromatic heterocyclic compounds having at least one N hetero atom in the ring(s) and substituted on the ring(s) with at least one substituent selected from the group consisting of halo, CN, $CF_3$, COOR, $COR^4$, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl, N,N-dimethyl-p-toluidine, and mixtures of any of the foregoing, with (B) an organic compound containing the structural element, —N=C—S—S—.

According to a special feature, the present invention provides an activator composition for the accelerated hardening of cyanoacrylate adhesives, wherein the activator comprises a mixture of an aromatic heterocyclic compound as described above and an organic compound having the structural element, —N=C—S—S—. According to a further feature, the present invention provides an activator composition for the accelerated hardening of cyanoacrylate adhesives, wherein the activator comprises a mixture of a 3,5-dihalopyridine and an organic compound having the structural element, —N=C—S—S—, more particularly the structural element, —N=C—S—S—C=N—, more especially —N=C—S—S—C=N— wherein the N=C and C=N double bonds are parts of aromatic heterocyclic rings.

According to a further aspect, the present invention provides an activator composition for the accelerated hardening of a cyanoacrylate adhesive throughout the adhesive, wherein the activator comprises a member selected from the group consisting of:

aromatic heterocyclic compounds having at least one N hetero atom in the ring(s) and substituted on the ring(s) with at least one electron-withdrawing group which decreases the base strength of the substituted compound compared to the corresponding unsubstituted compound, mixtures of any of the said aromatic heterocyclic compounds with each other, and/or with N,N-dimethyl-p-toluidine, and mixtures of any of the said aromatic heterocyclic compounds and/or N,N-dimethyl-p-toluidine with an organic compound containing the structural element, —N=C—S—S—.

This aspect of the invention is particularly directed to good CTV performance, in particular accelerated hardening throughout the adhesive, in drops of adhesive or relatively large layers of adhesive in a joint gap which is larger than the "zero gap" achieved when two substrate surfaces are in contact. In general a gap having a greater width than 10 microns is of interest. The depth of the adhesive drop or layer perpendicular to the substrate surface is suitably in the range 0.5 mm–2 mm, particularly 0.75 mm–1.25 mm.

In the said organic compound containing the structural element —N=C—S—S—, the N=C double bond may optionally be part of an aromatic system, which may suitably be monocyclic, bicyclic or tricyclic. For example, the N=C double bond may suitably be part of an aromatic heterocyclic ring having one or more N hetero atoms in the ring, optionally with one or more other hetero atoms selected from S and O. The heterocyclic ring may be substituted.

Desirably the said organic compound contains the structural element —N=C—S—S—C=N—, in which case both the N=C double bond and the C=N double bond may optionally be part of aromatic systems as described above, suitably two similar aromatic systems. More desirably the said organic compound is selected from dibenzothiazyl disulfide, 6,6'-dithiodinicotinic acid, 2,2'-dipyridyl disulfide, and bis(4-t-butyl-1-isopropyl-2-imidazolyl) disulfide. Of course, combinations of these organic compounds may also be used. Organic compounds having structural element —N=C—S—S—, which are useful as accelerators for accelerating the curing of CA adhesives if diluted in a solution, are described in WO 00/39229 and the corresponding U.S. Patent of Henkel KGaA, both of which were published after the first priority date of this application and the contents of which are incorporated herein by reference.

Desirably the activator comprises a member selected from the group consisting of pyridines, quinolines, pyrimidines and pyrazines substituted on the ring(s) with at least one electron-withdrawing group which decreases the base strength of the substituted compound compared to the corresponding unsubstituted compound.

An aromatic heterocyclic compound may suitably be monocyclic, bicyclic or tricyclic. The N hetero atoms(s) may be present in one or more of the rings. Two or more heterocyclic rings may be fused, or a heterocyclic ring may be fused to one or more carbocyclic rings. A heterocyclic ring may suitably be a 5- or 6-membered ring and may suitably have one or two N-atoms in the ring. A 6-membered heterocyclic ring is particularly suitable. In the case of two fused heterocyclic rings, the total number of N-atoms is suitably not more than three. The aromatic heterocyclic compounds are suitably substituted on the ring carbon atoms. A carbocyclic ring fused to a heterocyclic ring may suitably have 6 carbon atoms and/or may be an aromatic ring. A compound comprising a heterocyclic ring fused to a carbocyclic ring may be substituted by electron-withdrawing group(s) on either or both of the heterocyclic and carbocyclic rings.

Suitably the at least one electron-withdrawing group is selected from the group consisting of halo, CN, $CF_3$, COOR, $COR^4$, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl. Suitably the number of electron-withdrawing group(s) (which may be the same or different) may be from 1 to 3 groups per ring, for example 1 or 2 groups per ring.

For example, the electron-withdrawing group(s) may be selected from the group consisting of halo, CN, COOR and $COR^4$. Desirably $R^4$ is optionally substituted $C_1$–$C_{10}$ alkyl or optionally substituted $C_6$–$C_{20}$ aryl. R, $R^1$, $R^2$, $R^3$ and $R^4$ may suitably be optionally substituted $C_1$–$C_5$ alkyl, for example unsubstituted $C_1$–$C_5$ alkyl.

The criterion that the electron-withdrawing group decreases the base strength of the substituted compound compared to the corresponding unsubstituted compound may be determined by pKa measurement in water under standard conditions (e.g. 25° C. and zero ionic strength) by conventional means or using a software package which calculates pKa of the base such as "ACD/pKa Calculator" available from Advanced Chemistry Development, 133 Richmond Street West, Suite 605, Toronto, ON N5H 2LS, Canada. A decrease in base strength is indicated by a reduction in pKa value.

The aromatic heterocyclic compound substituted with electron-withdrawing groups may also be substituted on the ring with one or more electron-releasing groups, provided that overall the base strength (i.e. the pKa) is reduced compared to the corresponding unsubstituted compound.

According to a particular aspect, the aromatic heterocyclic compound is selected from:

pyridines having one or more electron-withdrawing groups in the 3-, 3,4- or 3,5-position on the ring, suitably 3,5-dihalopyridines, such as 3,5-dichloropyridine or 3,5-dibromopyridine, or 3-cyano pyridine, a lower alkyl 3,5-pyridine dicarboxylate, or a 5-halo nicotinic acid such as 5-bromo nicotinic acid, pyridines having an electron-withdrawing group in the 2 position on the ring, suitably a COOR or $COR^4$ group, such as 2-acetyl pyridine, pyridines having an electron-withdrawing group in the 4-position on the ring, suitably 4-nitropyridine, pyrimidines having an electron-withdrawing group in the 4- or 5-position on the ring, suitably 4- or 5-halo pyrimidines, such as 4-bromopyrimidine or 5-bromopyrimidine, nitroquinolines, suitably 5-nitroquinoline, polyhalogenated quinolines, suitably 4,7-dihalo quinolines such as 4,7-dichloro quinoline, pyrazines having an electron-withdrawing group in the 2-position on the ring, suitably 2-methoxy pyrazine or 2-methylthio pyrazine.

and aromatic heterocyclic compounds which are substantially iso-electronic to any of the foregoing compounds.

According to one feature, the present invention provides an activator composition for the accelerated hardening of cyanoacrylate adhesives, wherein the activator comprises a member selected from the group consisting of:

aromatic heterocyclic compounds having at least one N hetero atom in the ring(s) and substituted on the ring(s) with at least one substituent selected from the group consisting of halo, CN, $CF_3$, COOR, $COR^4$, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl, mixtures of any of the foregoing with each other, and/or with N,N-dimethyl-p-toluidine, and mixtures of any of the foregoing and/or N,N-dimethyl-p-toluidine with an organic compound containing the structural element, —N=C—S—S—.

According to a further aspect, the present invention includes the use of a composition as defined above for the accelerated hardening of a cyanoacrylate adhesive. The composition may be applied to a substrate before application of the cyanoacrylate adhesive thereto, and/or the composition may be applied to the cyanoacrylate adhesive after application of the adhesive to a substrate.

According to a further aspect, the present invention provides an adhesive system comprising a cyanoacrylate adhesive together with a composition as defined above. Suitably, the composition as defined above is held separately from (i.e. does not contact) the adhesive prior to application on a substrate.

According to another aspect, the present invention provides a process for the bonding of substrates or parts, characterised by either of the following series of steps:

(a) dispensing an activator composition as defined above onto at least one surface of the substrates or parts to be joined;

(b) optionally exposing solvent or other liquid vehicle in the activator composition to air, optionally with heating or with the aid of a fan;

(c) optionally holding the substrate or part having the activator composition thereon for a retention or shipping period, (d) applying a cyanoacrylate adhesive to at least one substrate or part;

(e) joining the substrates or parts, optionally with manual or mechanical fixing, and (f) optionally subsequently dispensing the activator composition onto adhesive exposed from a joint gap; or (i) applying a cyanoacrylate adhesive onto at least one surface of the substrates or parts to be joined;

(ii) joining the substrates or parts, optionally with manual or mechanical fixing;

(iii) dispensing an activator composition as defined above onto the adhesive before or after the step of joining the substrates or parts, and (iv) optionally exposing solvent or other liquid vehicle in the activator composition to air, optionally with heating or with the aid of a fan.

Suitably the retention or shipping period in step (c) may be in the range from several minutes to several days, for example from two minutes to forty-eight hours. Optionally the activator composition may be applied onto parts prior to their shipping, forwarding or delivery to an end-user, customer or contractor.

The present invention includes a bonded assembly of substrates or parts bonded by a process as defined above. The present invention also includes as an article of commerce a substrate or part having a composition as defined above applied thereto.

According to another aspect, the present invention provides an activator composition for the accelerated hardening of cyanoacrylate adhesives, wherein the composition comprises a solution of one or more activators in a solvent mixture which comprises a volatile hydrocarbon and a cyclic ketone. Cyclic ketones as co-solvents have shown better results in reducing the "halo effect" discussed above than linear ketones such as acetone, butanone, pentanone, hexanone, 4-methyl-2-pentanone, or octanone; than cyclic ethers such as dioxane or tetrahydrofuran; or than adhesive-miscible solvents such as ethyl acetate.

Suitably, the cyclic ketone is present in an amount of up to about 15%, especially up to about 12%, particularly up to about 10%, by weight of the solvent mixture. If an amount substantially greater than 10%, and particularly greater than 15% is used, there may be a risk that a plastic substrate will be attacked. Desirably, the cyclic ketone is present in an amount of at least about 2.5% by weight of the solvent mixture. Below this amount the reduction in the "halo effect" may not be sufficient for full visual satisfaction. Preferably, the cyclic ketone is present in an amount of at least about 3% by weight of the solvent mixture. At or above this level the presence of cyclic ketone is seen to be beneficial. Desirably, the cyclic ketone is present in an amount in the range of 3% to 7.5% by weight of the solvent mixture, particularly an amount in the range of 4% to 7% by weight of the solvent mixture.

A cyclic ketone may suitably be monocyclic or bicyclic.

Suitably the cyclic ketone is an optionally-substituted cyclic ketone, desirably an alicyclic ketone, having 3–10 carbon atoms in the ring. A substituted cyclic ketone may be mono- or di-substituted on the ring with $C_1$–$C_5$ alkyl, more particularly $C_1$–$C_2$ alkyl.

One particular example of suitable cyclic ketone is cyclohexanone. Other examples include cyclobutanone, cyclopentanone, cycloheptanone and 2-methyl cyclopentanone. Examples of bicyclic ketones include 2-norbornanone, bicyclo[3.2.1]octan-2-one and bicyclo[2.2.2] octanone.

Desirably, the volatile hydrocarbon is an aliphatic hydrocarbon. Suitably, the volatile aliphatic hydrocarbon may have from 4 to 10 carbon atoms, particularly from 5 to 8 carbon atoms, and may be straight chain, branched or cyclic. One particular example of a suitable hydrocarbon is n-heptane.

In one aspect, the present invention relates to use of an activator composition as defined above for the accelerated hardening of a cyanoacrylate adhesive, particularly when the activator composition is applied to the cyanoacrylate adhesive after application of the adhesive to a substrate.

In an activator composition for the accelerated hardening of cyanoacrylate adhesives, the activator may suitably comprise a member selected from the group consisting of:

organic amines including: lower fatty amines, aromatic amines, dimethylamine and the like; aliphatic, alicyclic and, especially, tertiary aromatic amines; such as N,N-dimethylbenzylamine, N-methylmorpholine and N,N-diethyltoluidine;

amine compounds with a boiling point of between 50° C. and 250° C. such as triethylamine, diethylamine, butylamine, isopropyl amine, tributyl amine, N,N-dimethyl aniline, N,N-diethyl aniline, N,N-dimethyl-p-toluidine, N,N-dimethyl-m-toluidine, N,N-dimethylo-toluidine, dimethyl benzyl amine, pyridine, picoline, vinyl pyridine, ethanolamine, propanolamine and ethylene diamine;

organic compounds containing the structural element, —N=C—S—S— (as described above).

aromatic heterocyclic compounds having at least one N hetero atom in the ring(s) and substituted on the ring(s)with at least one electron-withdrawing group which decreases the base strength of the substituted compound compared to the corresponding unsubstituted compound (as described above), and mixtures of any of the foregoing with each other.

According to one aspect, the present invention includes the use of an activator composition as defined above for the accelerated hardening of a cyanoacrylate adhesive. The composition may be applied to a substrate before application of the cyanoacrylate adhesive thereto, but more suitably the composition is applied to the cyanoacrylate adhesive after application of the adhesive to a substrate.

According to a further aspect, the present invention provides an adhesive system comprising a cyanoacrylate adhesive together with an activator composition as defined above. Suitably, the activator composition as defined above is held separately from the adhesive prior to application on a substrate.

According to another aspect, the present invention provides a process for the bonding of substrates or parts, characterised by the following series of steps:

(i) applying a cyanoacrylate adhesive onto at least one surface of the substrates or parts to be joined;

(ii) joining the substrates or parts, optionally with manual or mechanical fixing;

(iii) dispensing an activator composition comprising a solution of one or more activators in a solvent mixture which comprises a volatile hydrocarbon and a cyclic ketone onto the adhesive before or after the step of joining the substrates or parts, and (iv) optionally exposing the solvent mixture in the activator composition to air, optionally with heating or with the aid of a fan.

The process of the invention is particularly advantageous when at least one of the substrates has a surface of a dark colour or is transparent and/or at least one of the substrates is of a plastics material. However the invention is also useful with substrates of other materials such as cardboard, paper, or wood, particularly if the surface is of a dark colour.

The present invention includes a bonded assembly of substrates or parts bonded by a process as defined above.

Desirably, an activator composition comprises an amount of activator effective to accelerate hardening of a cyanoacrylate adhesive, the activator being carried in a suitable solvent mixture in accordance with the invention.

The solutions of the activator(s) may suitably contain the activator compound(s) in concentrations of from 0.01 to 10 g per 100 ml of solvent mixture; for example, from 0.05 to 5 g of activator substance are dissolved per 100 ml of solvent mixture.

Various conventional organic solvents are suitable as the hydrocarbon solvent (in the solvent mixture) for the activator(s) according to this aspect of the present invention, provided they have a sufficiently high volatility. Desirably, the boiling point of the solvent is below about 120° C., suitably below about 100° C., at ambient pressure. Although aromatic solvents such as toluene or xylene may be used, the hydrocarbon solvent is desirably an aliphatic hydrocarbon. Suitable solvents include specialized boiling point gasolines, but especially n-heptane, n-hexane, n-pentane, octane, cyclohexane, cydopentane, methyl cyclopentane, methyl cyclohexane and isomers of them like isooctane, methylhexanes, methylpentanes, 2,2-dimethyl butane (neohexane), or mixtures thereof, as well as petroleum benzines and ligroin.

DETAILED DESCRIPTION OF THE INVENTION

An alkyl group may be straight-chained or branched and may be unsaturated, i.e. the term alkyl as used herein includes alkenyl and alkynyl. A $C_1$–$C_{10}$ alkyl group may for example be a $C_1$–$C_5$ alkyl group. A lower alkyl group may suitably be a $C_1$–$C_5$ alkyl group. An aryl group includes phenyl and naphthyl groups, either of which may be substituted with an alkyl group, more particularly a lower alkyl group. Halo includes chloro, bromo, fluoro and iodo, as well as pseudohalo-radicals such as CN, SCN, OCN, NCO, NCS.

An optionally substituted alkyl, alkoxy or aryl group may be substituted with a substituent selected from the group consisting of halo, CN, $CF_3$, COOR, COR, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$ and $R^2$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl.

In an organic compound containing the structural element —N=C—S—S—, in which the N=C double bond is part of a heterocyclic ring, the heterocyclic ring may be substituted for example with optionally substituted $C_1$–$C_{10}$ alkyl, optionally substituted $C_1$–$C_{10}$ alkoxy, optionally substituted $C_1$–$C_{10}$ alkoxyalkyl, halo, CN, $CF_3$, COOR, COR, OR, SR, $CONR^1R^2$, $NO_2$, SOR, $SO_2R^3$, $SO_3R^3$, $PO(OR^3)_2$ and optionally substituted $C_6$–$C_{20}$ aryl or aryloxy, $CSOR^3$, $COONR^3_2$, $NRCOOR$, $N=N—R^3$, $OOR^3$, $SSR^3$, $OOCOR^3$, $NOR^3_2$, $ON(COR^3)_2$, S-aryl, $NR^3_2$, SH, OH, $SiR^3_3$, $Si(OR^3)_3$, $OSiR^3_3$, $OSi(OR^3)_3$, $B(OR^3)_2$, $P(OR^3)_2$, $SOR^3$, $OSR^3$, wherein R,$R^1$ and $R^2$ (which may be the same or different) are H, optionally substituted $C_1$–$C_{10}$ alkyl, or optionally substituted $C_6$–$C_{20}$ aryl, and $R^3$ (which may be the same or different) is optionally substituted $C_1$–$C_{10}$ alkyl, or optionally substituted $C_6$–$C_{20}$ aryl.

Desirably, an activator composition comprises an amount of activator effective to accelerate hardening of a cyanoacrylate adhesive, the activator being carried in a suitable vehicle.

Suitably the activator composition is an activator solution of the activator in a solvent. Alternatively the composition may be a dispersion of the activator in a suitable vehicle, particularly a liquid vehicle.

Desirably, the activator(s) are dissolved in readily volatile organic solvents, such as hydrocarbons, carboxylic acid esters, ketones, ethers or halogenated hydrocarbons and carbonic acid esters or acetals or ketals. The solutions of the activator(s) may suitably contain the activator compound(s) in concentrations of from 0.01 to 10 g per 100 ml of solvent; for example, from 0.05 to 5 g of activator substance are dissolved per 100 ml of solvent.

When the activator composition contains a mixture of two activator compounds, the respective amounts of the activator compounds may vary and are only limited by respective amounts which will no longer be effective for the desired combination of properties. More particularly, when the activator composition contains a mixture of an aromatic heterocyclic compound substituted with at least one electron-withdrawing group and an organic compound having the structural element —N=C—S—S—, the activator compounds may suitably be present in amounts of about 0.1% to about 10% by weight of the said aromatic heterocyclic compound and about 0.01% to about 5% by weight of the said organic compound, more particularly about 0.05% to about 1%, of the said organic compound (c), based on the total weight of the activator composition.

Various conventional organic solvents are suitable as solvents for the activator(s) according to the present invention, provided they have a sufficiently high volatility. Desirably, the boiling point of the solvent is below about 120° C., suitably below about 100° C., at ambient pressure. Suitable solvents include specialized boiling point gasolines, but especially n-heptane, n-bromopropane, alcohols, for example isopropyl alcohol, alkyl esters of lower carboxylic acids, for example ethyl acetate, isopropyl acetate, butyl acetate, ketones, such as acetone, methyl isobutyl ketone and methyl ethyl ketone. Also suitable are ether solvents, ether esters or cyclic ethers, such as, especially, tetrahydrofuran. In the case of sparingly soluble activators, chlorinated hydrocarbons, such as dichloromethane or trichloromethane (chloroform), may also be used.

The activator compositions according to the present invention are suitable for the accelerated hardening of conventional cyanoacrylate adhesives which contain as the fundamental constituent one or more cyanoacrylic acid esters, suitably with inhibitors of free-radical polymerisation, inhibitors of anionic polymerisation and, optionally, conventional auxiliary substances employed in such adhesive systems, like fluorescence markers.

The cyanoacrylic acid esters used in the adhesives are in the main one or more esters of 2-cyanoacrylic acid. Such esters correspond to the following general formula:

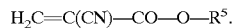

In that formula, $R^5$ represents an alkyl, alkenyl, cycloalkyl, aryl, alkoxyalkyl, aralkyl or haloalkyl or other suitable group, especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl or 2-ethoxyethyl group. The above-mentioned cyanoacrylates are known to a person skilled in the art of adhesives, see Ullmann's Encyclopaedia of Industrial Chemistry, Volume A1, p. 240, Verlag Chemie Weinheim (1985) and U.S. Pat. Nos. 3,254,111 and 3,654,340. Preferred monomers are the allyl, methoxyethyl, ethoxyethyl, methyl, ethyl, propyl, isopropyl or butyl esters of 2-cyanoacrylic acid. The monocyanoacrylic acid esters represent the largest proportion by weight of the polymerisable monomers in the adhesive.

The mentioned cyanoacrylic acid esters may suitably be present in the adhesives in amounts of from 99.99 to 90 wt. %. Preference is given to cyanoacrylic acid esters the alcohol radical of which is derived from alcohols having from 1 to 10 carbon atoms, which may also be cyclic, branched or perfluorinated.

The cyanoacrylate adhesives according to the present invention may also contain an inhibitor of free-radical polymerisation. Such inhibitors are, for example, hydroquinone, p-methoxyphenol, but also sterically-hindered phenols, phenothiazine and the like.

The cyanoacrylate adhesives according to the present invention may also contain thickeners as further auxiliary substances. That is desirable especially when there are to be bonded porous materials which otherwise readily absorb the low viscosity adhesive. Many types of polymer may be used as thickeners, such as polymethyl methacrylate, other methacrylate copolymers, acrylic rubber, cellulose derivatives, polyvinyl acetate or polyalphacyanoacrylate. A usual amount of thickener is generally about 10 wt. % or less, based on the total adhesive. In addition to or instead of the thickeners, the cyanoacrylate adhesives according to the present invention may also contain Reinforcing agents. Examples of such reinforcing agents are acrylic elastomers, acrylonitrile copolymers, elastomers or fluoroelastomers. Moreover, inorganic additives may also be used, for example silicates, thixotropic agents having a large surface area, which may be coated with polydi-alkylsiloxanes.

The cyanoacrylate adhesives according to the present invention may also contain substances for increasing the thermal stability thereof. There may be used for that purpose, for example, the sulfur compounds mentioned in European Patent specification No. 579 476.

In addition to or instead of the mentioned additives, the cyanoacrylate adhesives according to the present invention may also contain plasticisers. These serve to protect the resulting adhesive bond from brittleness. Such plasticisers are, for example, $C_1$–$C_{10}$ alkyl esters of dibasic acids, especially of sebacic acid, phthalic acid or malonic acid. Other plasticisers are diaryl ethers and polyurethanes and the like. Furthermore, the adhesive preparations according to the present invention may also contain colorings, pigments, aromatic substances, extenders and the like, as well as fluorescing additives. Reference is directed to U.S. Pat. No. 5,749,956 (Fisher et al.), U.S. Pat. No. 4,869,772 (McDonnell et al.) and U.S. Pat. No. 5,314,562 (McDonnell et al.), the contents of which are incorporated herein by reference.

The activator compositions of the present invention are intended to be used with a wide variety of both metallic and non-metallic substrates, including substrates having acidic surfaces such as wood and paper or cardboard, and plastics substrates.

In the aspect of the invention using a cyclic ketone as a co-solvent, the advantage of the activator solutions of the invention is particularly evident on dark-coloured substrates.

The present invention will now be illustrated in greater detail.

EXAMPLES

In the Examples, the following abbreviations and terms are used:

DCP = 3,5-dichloro pyridine,
NQ = 5-nitro quinoline,
DPDS = 2,2'-dipyridyl disulfide,
DMPT = N,N-dimethyl-p-toluidine,
Heptane = n-heptane,
CNP = 3-Cyano Pyridine
<1% CNP = Saturated solution of CNP in heptane, it was not fully soluble at 1% concentration
BP = 5-bromo pyrimidine,
DPPDC = Dipropyl 3,5-Pyridine Dicarboxylate,
BNA = 5-bromo nicotinic acid in IPA solvent
MPyr = 2-methoxy pyrazine;
IPA = isopropyl alcohol solvent,
HPOL = heptan-1-ol solvent,
s = seconds
Loctite 401, Loctite 411, Black Max/Loctite 380, Loctite 416 and Loctite 424 = Different grades of Loctite ethyl cyanoacrylate-based adhesive
7457 = Loctite 7457 (activator)

DBP = 3,5-dibromo pyridine,
DCQ = 4,7-dichloro quinoline,
BBID = Bis(4-t-butyl-isopropyl-2-imidazolyl) disulfide,
NBP = n-bromopropane,
CTV = cure through volume
THF = tetrahydrofuran ACP - 2-acetyl pyridine MTPyr = 2-methylthio pyrazine
DIOX = 1,4-dioxane solvent
DCB = 1,2-dichloro benzene solvent
MS = mild steel 7455 = Loctite 7455 (activator).

Loctite 401 (also called 401 herein) is a low viscosity, fast curing, single component ethyl cyanoacrylate adhesive (see for example U.S. Pat. No. 4,695,615).

Loctite 411 (also called 411 herein) is a single component high viscosity ethyl cyanoacrylate adhesive formulated for impact and peel resistance (see for example U.S. Pat. No. 4,477,607)

Black Max—Loctite 380—is a black, rubber toughened ethyl cyanoacrylate adhesive with enhanced resistance to peel and shock loads (see for example U.S. Pat. No. 4,440,910).

Loctite 424 is an ethyl cyanoacrylate adhesive particularly for bonding EPDM and other similar elastomers.

Loctite 416 is a high viscosity ethyl cyanoacrylate adhesive for bonding rubbers, plastics and metals.

Loctite 401: ethylcyanoacrylate; acidic stabilizer against anionic polymerization; antioxidant against radical polymerization; polymer thickening agent; curing accelerator (see for example EP-A-0151521 and EP-A-0259016).

Loctite 406: ethylcyanoacrylate; acidic stabilizer against anionic polymerization; antioxidant against radical polymerization; polymer thickening agent; adhesion promoter.

Loctite 407: ethylcyanoacrylate; acidic stabilizer against anionic polymerization; antioxidant against radical polymerization; polymer thickening agent; adhesion promoter (see for example WO 8200829 A1).

Loctite 410: ethylcyanoacrylate; acidic stabilizer against anionic polymerization; antioxidant against radical polymerization; polymer thickening agent; adhesion promoter; silica; toughening agent (see for example WO 8302450 A1)

Loctite 431: ethylcyanoacrylate; acidic stabilizer against anionic polymerization; antioxidant against radical polymerization; polymer thickening agent; curing accelerator.

Loctite 460: methoxyethyl cyanoacrylate; acidic stabilizer against anionic polymerization; antioxidant against radical polymerization; polymer thickening agent.

Loctite LID-3693: ethylcyanoacrylate+n-butylcyanoacrylate; acidic stabilizer against anionic polymerization; antioxidant against radical polymerization; polymer thickening agent; plasticizer (ester type); curing accelerator.

Loctite LID-3692: the same as LID-3693 except that it is of higher viscosity.

Sicomet 5195: ethylcyanoacrylate; acidic stabilizer against anionic polymerization; antioxidant against radical polymerization; polymer thickening agent Loctite 7455 is a single component surface activator based on DMPT in heptane.

Loctite 7457 is another single component surface activator based on poly(oxypropylene) diamine in heptane.

Loctite is a trade mark. The above Loctite products are commercially available from Loctite Corporation, Rocky Hill, Conn., USA or Loctite (Ireland) Limited, Dublin 24, Ireland. The above Sicomet product is available from Sichel-Werke GmbH, Sichelstrasse 1, 30453 Hanover, Germany.

Permabond CSA activator is commercially available from National Starch & Chemical
Company, 10 Finderne Avenue, Bridgewater, N.J., USA.
ABS=acrylonitrile-butadiene-styrene terpolymer
PMMA=polymethylmethacrylate The concentration of activator in an activator solution is expressed as % by weight based on the amount of solvent. The concentration of cyclohexanone is expressed as % by weight based on the total amount of solvent, the remainder being n-heptane.

pKa Values

The pKa values of the compounds used in the Examples together with those of the parent compounds are given below.

| Activator Calculated pKa (±0.2) | | | |
|---|---|---|---|
| Pyridine (parent) | 5.32 | CNP | 1.78 |
| Quinoline (parent) | 4.97 | NQ | 2.8 |
| Pyrimidine (parent) | 1.29 | DCQ | 1.99 |
| Pyrazine (parent) | 1.0 | DPPDC | 1.84 |
| DMPT | 5.66 | BP | −0.06 |
| DCP | 0.66 | ACP | 2.68 |
| DBP | 0.52 | MPyr | 0.81 |

Example 1

Post Spray tests were carried out by applying a 10 µl drop of adhesive onto a substrate and then spraying a chosen activator onto the drop. Full Cure Time is the time required for the adhesive drop to cure fully.

In Pre Spray tests the selected activator solution is sprayed onto the substrate before application of a 10 µl drop of adhesive. On Part Time is the time interval between application of the spray and addition of the adhesive drop.

The Post Spray cure speeds of a range of activators are shown in table 1. DCP, DBP and CNP provided faster Post Spray cure times than DMPT with Loctite 401 adhesive on a cardboard substrate, although good CTV performance was also obtained from the other activators listed.

TABLE 1

Post spray full cure times of various activators in heptane solvent for a 10 µl drop of 401 adhesive on a cardboard substrate.

| Activator | Conc (%) | Full Cure Time (s) |
| --- | --- | --- |
| DMPT | 1 | 15 |
| DCP | 1 | 10 |
| DBP | 1 | 12.5 |
| CNP* | <1 | 6 |
| NQ | 3 | 7.5 |
| DCQ | 3 | 30 |
| DPPD | 1 | 30 |
| BP | 1 | 40–45 |
| ACP | 1 | 60 |
| BNA+ | 1 | 195 |

*saturated solution in heptane was not fully soluble at 1% conc.
+IPA solvent

Table 2 compares the Post Spray performance of DCP and DBP with that of DMPT for various adhesive grades on cardboard and mild steel substrates. 3% levels of DCP were required to match the cure speed of 1% DMPT on a mild steel substrate. Similarly 3% levels of DCP and DBP were required to match the cure speed of DMPT with higher viscosity Black Max and 411 grades of adhesive on a cardboard substrate.

The difference in Post Spray cure speed of both DCP and DMPT with a fresh and less active aged sample of 401 on a cardboard substrate is shown in table 2. It is evident that DCP levels of ~0.75% provided similar cure speeds to 1% DMPT for both the fresh and aged adhesive.

1% MPyr and MTPyr had post spray CTV times better than or at least as fast as those obtained with DMPT.

TABLE 2

Post Spray skin and full cure times of various activators in heptane solvent for a range of different adhesive grades with 10 ul drop of adhesive on cardboard and mild steel substrates.

| Activator | Conc (%) | Adhesive | Substrate | Skin Time (seconds) | Full Cure Time (seconds) |
| --- | --- | --- | --- | --- | --- |
| DMPT | 1.0 | Aged 401 | Cardboard | nm | 20–25 |
| " | 1.0 | Fresh 401 | " | " | 15 |
| DCP | 0.25 | Aged 401 | " | " | 50 |
| " | 0.5 | " | " | " | 30 |
| " | 0.75 | " | " | " | 20 |
| " | 1.0 | " | " | " | 15 |
| " | 0.25 | Fresh 401 | " | " | 30 |
| " | 0.5 | " | " | " | 20 |
| " | 0.75 | " | " | " | 15 |
| " | 1.0 | " | " | " | 10 |
| " | 3.0 | " | " | " | 7.5 |
| DBP | 1.0 | " | " | " | 12.5 |
| " | 3.0 | " | " | " | 7.5 |
| DMPT | 1.0 | 411 | " | 15 | 25 |

TABLE 2-continued

Post Spray skin and full cure times of various activators in heptane solvent for a range of different adhesive grades with 10 ul drop of adhesive on cardboard and mild steel substrates.

| Activator | Conc (%) | Adhesive | Substrate | Skin Time (seconds) | Full Cure Time (seconds) |
| --- | --- | --- | --- | --- | --- |
| DCP | 1.0 | " | " | 15–20 | 45 |
| " | 3.0 | " | " | 15 | 25 |
| DBP | 1.0 | " | " | 15 | 45 |
| " | 3.0 | " | " | 15 | 25 |
| DMPT | 1.0 | Black Max | " | 30 | 150 |
| DCP | 1.0 | " | " | 40 | 210 |
| " | 3.0 | " | " | 30 | 120 |
| DBP | 1.0 | " | " | 75 | 225 |
| " | 3.0 | " | " | 30 | 135 |
| DMPT | 1.0 | 401 | Mild Steel | nm | 7.5 |
| DCP | 1.0 | " | " | " | 20 |
| " | 2.0 | " | " | " | 15 |
| " | 3.0 | " | " | " | 7.5 |
| MPyr | 1.0 | 401 | Cardboard | " | 6 |
| MTPyr | 1.0 | 401 | Cardboard | " | 20 |

(nm = not measured)

The Pre Spray cure speed of DCP, DBP, DCQ and NQ on a cardboard substrate is compared with DMPT in table 3. The results show that 3% levels of DCP were required to match the "On Part Time" performance of 1% DMPT. The performance of 1% DBP was closely similar to that of 1% DMPT. A notable feature of the results is the good long term "On Part Time" performance of DBP, NQ and DBP at 3% levels. NQ in particular showed no change in its curing behaviour even after an "On Part Time" of 24 hours.

Mpyr and MTPyr had pre spray CTV times slower than those obtained with DMPT. The beneficial effect of adding 10% of high boiling point solvents to 2 and 3% DCP in heptane is also illustrated in table 3.

TABLE 3

Effect of different activators, activator concentration, solvent and activator "On Part Time" on the Pre Spray skinning and full cure time of a 10 µl drop of 401 adhesive on a cardboard substrate. The solvent is heptane unless otherwise indicated.

| Activator | Conc. (%) | Co Solvent | On Part Time (minutes) | Skin Time (minutes) | Full Cure Time (minutes) |
| --- | --- | --- | --- | --- | --- |
| DMPT | 1.0 | None | 1 | 0.3–0.5 | 1.0–1.25 |
| " | " | " | 15 | 1.5 | 2.75 |
| " | " | " | 60 | 5.0 | 7.0 |
| " | " | " | 180 | 9.0–9.5 | 12.0 |
| DCP | " | " | 1 | 1.0 | 2.0 |
| " | " | " | 15 | 4.0 | 7.0–7.5 |
| " | " | " | 60 | 7.0 | 10.5 |
| " | 2.0 | " | 1 | 1.0 | 2.0 |
| " | " | " | 15 | 3.5 | 6.0 |
| " | " | " | 60 | 6.0 | 9.5 |
| " | 3.0 | " | 1 | 0.17 | 0.6 |
| " | " | " | 15 | 0.75 | 1.5 |
| " | " | " | 60 | 3.5 | 6.0 |
| " | " | " | 180 | 7.5 | 11.0 |
| " | 2.0 | 10% DIOX | 1 | 0.08–0.16 | 0.25 |
| " | " | " | 15 | 1.5 | 2.25 |
| " | " | " | 60 | 3.5 | 6.0 |
| " | " | " | 180 | 8.0 | 8.5 |
| " | 3.0 | 10% HPOL | 1 | 0.08–0.16 | 0.3 |
| " | " | " | 15 | 1.25 | 1.5 |
| " | " | " | 30 | 2.75 | 4.75 |
| " | " | " | 60 | 3.0 | 5.0 |

TABLE 3-continued

Effect of different activators, activator concentration, solvent and activator "On Part Time" on the Pre Spray skinning and full cure time of a 10 μl drop of 401 adhesive on a cardboard substrate. The solvent is heptane unless otherwise indicated.

| Activator | Conc. (%) | Co Solvent | On Part Time (minutes) | Skin Time (minutes) | Full Cure Time (minutes) |
|---|---|---|---|---|---|
| " | " | " | 180 | 7.5 | 8.5 |
| DBP | 1.0 | none | 1 | 0.3 | 0.5 |
| " | " | " | 15 | " | 4.75 |
| " | " | " | 30 | " | 7.5 |
| " | " | " | 60 | " | 1.5 |
| " | 3.0 | " | 1 | 0.08–0.16 | 0.25 |
| " | " | " | 15 | " | 0.25 |
| " | " | " | 30 | " | 0.25 |
| " | " | " | 60 | 1.3 | 2.5 |
| " | " | " | 120 | 2.5 | 5.5 |
| " | " | " | 180 | 12 | 17 |
| DCQ | 1.0 | none | 1 | — | 10.0 |
| " | 2.0 | " | 1 | 3.0 | 5.0 |
| " | " | " | 15 | 4.5 | 6.0 |
| " | " | " | 30 | 4.5 | 6.0 |
| " | " | " | 60 | 5.0 | 6.0 |
| " | " | " | 120 | 5.0 | 7.5 |
| " | 3.0 | " | 1 | 1.0 | 2.0 |
| " | " | " | 15 | 1.0 | 2.0 |
| " | " | " | 30 | 2.0 | 5.0 |
| " | " | " | 60 | 2.0 | 5.0 |
| " | " | " | 1080 | 2.5 | 5.0 |
| NQ | 3.0 | 100% IPA | 15 | 0.83 | 1.5 |
| " | " | " | 30 | " | " |
| " | " | " | 60 | " | " |
| " | " | " | 120 | " | " |
| " | " | " | 180 | " | " |
| " | " | " | 240 | " | " |
| " | " | " | 1440 | " | " |
| MPyr | 1.0 | " | initial | " | 14 |
| MTPyr | 1.0 | " | " | " | 1.25 |
| | | | 15 | | 10 |

"initial" = 20 seconds On Part Time. This allows time for solvent to evaporate.

The effect of high boiling point solvents on the Pre Spray performance of 1% DCP is illustrated in table 4. DCB and HPOL were particularly beneficial compared to the equivalent results with heptane solvent (c.f. table 3).

TABLE 4

Effect of high boiling point solvents on the Pre Spray performance of 1% DCP with a 10 μl drop of 401 adhesive on a cardboard substrate.

| Solvent | On Part Time (minutes) | Skin Time (minutes) | Full Cure Time (minutes) |
|---|---|---|---|
| DIOX | 1 | 1 | 2 |
| " | 15 | 4 | 5 |
| " | 60 | 11 | 13 |
| " | 120 | 30 | >50 |
| DCB | 1 | 1 | 2.5 |
| " | 15 | 2 | 3 |
| " | 60 | 7 | 8 |
| " | 120 | 11 | 14 |
| HPOL | 1 | 2 | 3 |
| " | 15 | 2.5 | 3.5 |
| " | 60 | 7 | 8 |
| " | 120 | 10 | 13 |

The Pre Spray cure speed of DMPT, DCP and NQ on a mild steel substrate are compared in table 5. Mild steel was a slower substrate than cardboard (c.f. table 3). As already found with cardboard, 3% levels of DCP were required to match the performance of 1% DMPT. Again NQ showed no change in its curing behaviour even after an "On Part Time" of 24 hours.

TABLE 5

Comparison of Pre Spray activator (DMPT, DCP and NQ) "On Part Time" versus full cure time for a 10 μl drop of 401 adhesive on a mild steel substrate.

| Activator | Conc. (%) | On Part Time (minutes) | Skin Time (minutes) | Full Cure Time (minutes) |
|---|---|---|---|---|
| DMPT | 1.0 | 1 | 2 | 5 |
| " | " | 15 | 5 | 30–35 |
| DCP | 3.0 | 1 | 2 | 5 |
| " | " | 15 | 5 | 30–35 |
| NQ | 3.0 | 15 | 10 | 13 |
| " | " | 30 | " | " |
| " | " | 60 | " | " |
| " | " | 120 | " | " |
| " | " | 180 | " | " |
| " | " | 240 | " | " |
| " | " | 1440 | " | " |

It will be seen from the test results that the activator solutions according to the invention have comparable or better properties than equivalent DMPT solutions.

Example 2

Tables 6A and 6B show the results of a series of tests carried out with Loctite 424. The various activators and their concentrations in the designated solvents are set out in Table 6A. This Table also includes the results for tests for the Fixture time on mild steel lap shears. The activator solution is applied to one of the lap shears and time is then allowed to elapse before adhesive is applied onto the other mating part and the overlapping lap shears are squeezed together so that the adhesive forms a thin layer. The time periods at the heading of each column of results indicate the time span between application of the activator solution and the bringing together of the lap shears i.e. one minute, two hours or twenty-four hours. The fixture times are indicated in many cases as a range, the lower figure indicating the time at which the lap shears were not fixed and the higher figure indicating the time by which the lap shears were already fixed. The actual fixture time would therefore lie in the range indicated.

Table 6B gives further results of tests on the same Compositions Nos. 1 to 42 as set out in Table 6A. "Pre Activation" and "Post Activation" tests are fillet cure tests carried out on cardboard. In "Pre Activation" tests one drop of activator solution is applied onto cardboard, then one drop of adhesive is applied onto the activator, either immediately after the solvent has been evaporated from the activator solution or after waiting for an additional period of fifteen seconds thereafter. The adhesive is left to cure without a second substrate being applied to it. The cure time (in minutes) is measured by testing the adhesive fillet with a spatula. Curing (hardening) is obtained when the fillet is thoroughly solid.

In "Post Activation" tests, one drop of adhesive is applied to the cardboard substrate, and one drop of activator solution is then applied to the adhesive. Again the fillet of adhesive is left to cure without application of a second substrate. In the columns of results, the heading "Whiten." indicates whitening of the surface, which is generally regarded as undesirable. "Crater.", indicates cratering (uneven surface), which is also undesirable. These two "cosmetic" effects are important physical parameters in determining whether a commercial adhesive will be generally accepted by end users.

The column headed "Skin" indicates the time in seconds up to the appearance of skin formation on the adhesive. This is judged visually by a change of the shine on the surface. The column headed "Through" indicates the time in minutes up to full cure through the fillet of adhesive. This is checked by pressing with a spatula.

Tensile shear strength on grit blasted mild steel was tested by standard methods. The results given in the column headed "TSS" are in $N/mm^2$.

Tests 1 to 11 show the use of an activator composition containing DPDS alone, and test 12 shows an activator composition based on BBID alone. These tests are not within the scope of the present invention. Tests 13 to 22 relate to an activator composition containing DCP alone and test 23 concerns a composition containing DBP alone. These compositions are in accordance with the invention. Test 24 is a comparative test using a DMPT solution of the prior art. Test 25, 26 and 27 are also comparative test using the commercially available activator composition Loctite 7457. Test 27A is another comparative test using the commercially available activator composition Loctite 7455.

Tests 28 to 42 use compositions based on combinations of activators in accordance with a special feature of the present invention.

The columns at the left hand edge of Table 6A facilitate comparison of the respective test results. Reviewing the key in columns a–k it will be seen that the marking in column a shows that test 28 relates to a combination of activators as used in tests 1 and 15. Likewise column b indicates that test 29 relates to a combination of the activator solutions used in tests 2 and 16 (NBP as solvent). The coding continues through to columns c to k in a similar manner.

The tests results in Table 6A and 6B are to be compared overall, taking account of the cosmetic effects as well as the technical data. It will be seen with reference to test 24 that the control example using DMPT shows a marked loss of fixture speed when there is a twenty-four hour time span between application of the activator solution and bringing together of the lap shears. There is also significant fixture speed loss with the use of 7457 and 7455. It will be seen by reference to tests 1 to 12 that when DPDS or BBID are used, that these activators have a pronounced accelerating action and almost no loss of surface activation. DCP and DBP, on the other hand, have relatively slow fixture times in this adhesive composition (Loctite 424).

Tables 7 and 8 show test results similar to those in Table 6B for activator compositions 26 and 28–37 but using Loctite 416 cyanoacrylate adhesive (Table 7) and Loctite 380 cyanoacrylate adhesive (Table 8).

When a combination of activators is used, particularly with formulations 28 to 41, it will be seen from the test results that good accelerating action and almost no loss of surface activation (e.g. after 24 hours) are achieved. In addition, the test results shown in Table 6B for the compositions containing combinations of activators are generally favourable as compared to those for DPDS or BBID alone. In particular, in the "Pre Activation" tests, the cure times for the combined activator compositions of tests 28 to 42 are generally significantly shorter than those for the comparable tests using DPDS or BBID alone.

Likewise, in the "Post Activation" tests the "cosmetic effects" are generally favourable in tests 28 to 42, and the Skin times and Through times are relatively short.

As seen, promising results have been found with combinations of DPDS and DCP.

The formulations 28–41 in particular show the following combination of properties:
1. No or no substantial loss of surface activation.
2. Fast cure after pre-activation.
3. No or no substantial shortcomings in cosmetics.
4. Fast through cure after post activation.
5. No or no substantial loss of bond strengths.

Activator solutions according to this invention would allow manufacturers to have long waiting periods between the steps of application of activator (surface activation) and application of adhesive (bonding parts).

Thus the invention can confer the following benefits:

Interruptions/breaks/hold-ups in production lines do not require repeated surface activation of the parts to be adhered.

Parts to be bonded can be activated in advance by the supplier or a contractor. This could be advantageous if manufacturer does not want to equip his production lines with activator application stages.

Large number of parts can be pre-treated in advance and be held in stock.

TABLE 6A

| No. | [% in (W/V)] Composition Activator | | | | | | | | Solvent | Fixture [s] (on MS) | | |
|---|---|---|---|---|---|---|---|---|---|---|---|---|
| | DPDS | BBID | DCP | DBP | DMPT | 7457 | 7455 | | | 1 min | 2 h | 24 h |
| 1 | 0.05% | | | | | | | | heptane | 5–10 | | 10–15 |
| 2 | 0.05% | | | | | | | | NBP | 10–15 | | 15–20 |
| 3 | 0.15% | | | | | | | | heptane | 4 | 4–5 | |
| 4 | 0.15% | | | | | | | | heptane | 4 | | 4–5 |
| 5 | 0.15% | | | | | | | | NBP | | | |
| 6 | 0.20% | | | | | | | | heptane | 4–5 | 4–5 | 5–6 |
| 7 | 0.20% | | | | | | | | NBP | | | |
| 8 | 0.45% | | | | | | | | heptane | | | |
| 9 | 0.45% | | | | | | | | NBP | | | |
| 10 | 0.45% | | | | | | | | heptane | 4–5 | 4–5 | 4–5 |
| 11 | 0.45% | | | | | | | | NBP | | | |
| 12 | | 0.15% | | | | | | | NBP | 20 | | 20 |
| 13 | | | 0.45% | | | | | | heptane | 15–20 | 20–35 | 25–30 |

TABLE 6A-continued

| | | | | | | | | | | | [% in (W/V)] Composition Activator | | | | | | | | | Fixture [s] (on MS) | | |
|---|---|---|---|---|---|---|---|---|---|---|---|---|---|---|---|---|---|---|---|---|---|
| k | i | h | g | f | e | d | c | b | a | No. | DPDS | BBID | DCP | DBP | DMPT | 7457 | 7455 | Solvent | 1 min | 2 h | 24 h |
| | | | | | | | | | | 14 | | | 0.45% | | | | | NBP | | | |
| | | | | | | | | ■ | | 15 | | | 0.50% | | | | | heptane | 40–50 | | 90–100 |
| | | | | | | | | | ■ | 16 | | | 0.50% | | | | | NBP | 50–55 | | 90–100 |
| | | | | | | | ▨ | | | 17 | | | 1.00% | | | | | heptane | 15–20 | | 60–70 |
| | | | | | | ■ | | | | 18 | | | 1.00% | | | | | NBP | 40–50 | | 80–90 |
| | | | | | ▤ | | | | | 19 | | | 1.40% | | | | | heptane | 10–15 | | 25–25 |
| | | | | | | | | | | 20 | | | 1.40% | | | | | NBP | | | |
| | | | | ■ | | | | | | 21 | | | 1.50% | | | | | NBP | 20–25 | | 60–70 |
| | | | | | | | | | | 22 | | | 1.50% | | | | | heptane | 10–15 | | 30–40 |
| | | | ■ | | | | | | | 23 | | | | 2.00% | | | | heptane | 3 | | 60 |
| | | ▥ | | | | | | | | 24 | | | | | 0.62% | | | heptane | 20 | | 120 |
| | | | | | | | | | | 25 | | | | | | + | | | 3–4 | | 75–80 |
| | | | | | | | | | | 26 | | | | | | + | | | 5–10 | | 20–30 |
| | | | | | | | | | | 27 | | | | | | + | | | 5 | | 35 |
| | | | | | | | | | | 27a | | | | | | | + | | 35–40 | | 120–150 |
| | | | | | | | | ■ | | 28 | 0.05% | | 0.50% | | | | | heptane | 5–10 | | 10–15 |
| | ▦ | | | | | | | | | 29 | 0.05% | | 0.50% | | | | | NBP | 5–10 | | 10–15 |
| ■ | | | | | | | | | | | | | | | | | | | | | |

TABLE 6A-continued

| | | | | | | | | | | | [% in (W/V)] Composition Activator | | | | | | | Fixture [s] (on MS) | | |
|---|---|---|---|---|---|---|---|---|---|---|---|---|---|---|---|---|---|---|---|---|
| k | i | h | g | f | e | d | c | b | a | No. | DPDS | BBID | DCP | DBP | DMPT | 7457 | 7455 | Solvent | 1 min | 2 h | 24 h |
| | | | | | | ■ | | | | 30 | 0.05% | | 1.00% | | | | | heptane | 4–5 | | 8–10 |
| | | | | | ■ | | | | | 31 | 0.05% | | 1.00% | | | | | NBP | 5–10 | | 13–15 |
| | | | | | | | ▨ | | | 32 | 0.10% | | 1.25% | | | | | heptane | 5–6 | | 5–8 |
| | | | | | | | | | | 33 | 0.10% | | 1.25% | | | | | NBP | 5–6 | | 7–9 |
| | | | | | | | | | | 34 | 0.15% | | 0.50% | | | | | heptane | | | |
| | | | | ▤ | | | | | | 35 | 0.15% | | 0.50% | | | | | NBP | | | |
| | | | | | | | ▨ | | | 36 | 0.15% | | 1.00% | | | | | heptane | | | |
| | | | | ▤ | | | | | | 37 | 0.15% | | 1.00% | | | | | NBP | 5–10 | | 5–10 |
| | | | ■ | | | | | | | 38 | 0.15% | | | 2.00% | | | | heptane | 3 | | 5 |
| | | | | | | | | | | 39 | 0.15% | | 1.00% | | 0.62% | | | heptane | 3–4 | | 5–10 |
| | | | | | | | | | | 40 | | 0.15% | 1.00% | | | | | NBP | 25 | | 25–30 |
| | | ▥ | | | | | | | | 41 | | 0.15% | | 2.00% | | | | NBP | 5–10 | | 20 |
| | ▦ | | | | | | | | | 42 | | | 1.00% | | 0.62% | | | heptane | 10 | | 150 |
| ■ | | | | | | | | | | | | | | | | | | | | | |

TABLE 6B

| | Pre-Activ. [min] | | Post-Activation | | | | TSS [N/mm2] | |
|---|---|---|---|---|---|---|---|---|
| | | 15 s after | | | [s] | [min] | (on GBMS) | |
| No. | immed. | drying | Whiten. | Crater. | Skin | Through | wet | dry |
| 1 | 6 | 11 | trace | trace | 30 | 9 | 17.7 | 18.6 |
| 2 | 5 | 110 | no | slightly | 30 | 4–5 | | |
| 3 | 12 | 55 | trace | trace | 30 | 12 | | |
| 4 | 23 | 32 | no | trace | 15 | 3 | | |
| 5 | 40 | 120 | no | no | 20 | 3 | | |
| 6 | 100 | 300 | no | no | 5–10 | 3 | | |
| 7 | | | no | slightly | 5–10 | 1 | | |
| 8 | 23 | 40 | trace | trace | 15 | 9 | | |
| 9 | | | no | slightly | 5 | 1 | | |
| 10 | 45 | 300 | no | no | 5–10 | 60 | | |
| 11 | 11 | 38 | no | no | 15 | 4–5 | | |
| 12 | 25 | 28 | no | no | 120 | 240 | | |
| 13 | 6 | 40 | no | no | 5–10 | 20 | | |
| 14 | 6 | 8 | slightly | slightly | 15–20 | 1 | | |
| 15 | 4 | 16 | no | no | 30 | 1–2 | | |
| 16 | 2–3 | 6 | no | no | 20 | 1–2 | | |
| 17 | 4 | 5 | no | no | 30 | 1–2 | | |
| 18 | 2 | 3 | no | no | 15 | 2 | | |
| 19 | 3 | 8 | slightly | no | 5–10 | 20 | | |
| 20 | 4 | 5 | no | slightly | 10 | 1 | | |
| 21 | 2 | 3–4 | no | no | 15 | 2 | | |
| 22 | 3 | 4 | no | slightly | 15 | 1 | 13.5 | 21.8 |
| 23 | 3 | 3–4 | no | trace | 10 | 1 | | |
| 24 | 4–5 | 10 | no | trace | 4 | 1–2 | | |
| 25 | 9 | 190 | severe | no | 5–10 | 20 | | |
| 26 | 2 | 13 | severe | no | 5 | 2–3 | 6.8 | 13.9 |
| 27 | 4–5 | 28 | severe | trace | 3 | 2 | | |
| 27a | 5–6 | 14 | trace | slightly | 6 | 2 | 17.1 | 8–5 |
| 28 | 4 | 12 | no | slightly | 10 | 2 | 14.2 | 19.3 |
| 29 | 2 | 3–4 | no | no | 15 | 1 | | |
| 30 | 5 | 6 | no | slightly | 10 | 2 | 16 | 19.6 |
| 31 | 1–2 | 2 | no | no | 15 | <1 | 15.3 | 17.4 |
| 32 | 4 | 5 | no | slightly | 10 | 1–2 | | |
| 33 | 1–2 | 2 | no | no | 10 | <1 | | |
| 34 | 12 | 14 | no | slightly | 10 | 2 | | |
| 35 | 2 | 2–3 | no | no | 10 | 2 | | |
| 36 | 4 | 6 | no | no | 15 | 2 | | |
| 37 | 2 | 2–3 | no | no | 15 | 1 | | |
| 38 | 3–4 | 3 | no | trace | 3 | 1–2 | | |
| 39 | 3 | 11 | no | trace | 5 | 1–2 | | |
| 40 | 1–2 | 9 | no | no | 30 | 1 | | |
| 41 | 3 | 5 | no | no | 20 | <1 | | |
| 42 | 3 | 3–4 | no | trace | 10 | 1 | | |

TABLE 7

Results with Cyanoacrylate adhesive LOCTITE 416:

| | | Pre Activ. | Post-Activation | | | |
|---|---|---|---|---|---|---|
| | | 15 s after | | | [s] | [min] |
| | No. | drying [min] | Whiten. | Crater. | Skin | Through |
| (Loctite 7457) | 26 | 19 | severe | slightly | 10 | 1–2 |
| | 28 | 5 | no | slightly | 20 | 1–2 |
| | 29 | 13 | no | slightly | 15 | 0.5 |
| | 30 | 3 | no | slightly | 15 | 1 |
| | 31 | 10 | no | slightly | 10 | 0.5 |
| | 32 | 4 | no | slightly | 10 | 0.5 |
| | 33 | 4 | no | slightly | 10 | 0.5 |
| | 34 | 5 | no | slightly | 20 | 1–2 |
| | 35 | 15 | no | slightly | 10 | 0.5 |
| | 36 | 5 | no | slightly | 15 | 1 |
| | 37 | 12 | no | slightly | 15 | 0.5 |

TABLE 8

Results with Cyanoacrylate adhesive LOCTITE 380:

| | | Pre Activ. | Post-Activation | | | |
|---|---|---|---|---|---|---|
| | | 15 s after | | | [s] | [min] |
| | No. | drying [min] | Whiten. | Crater. | Skin | Through |
| (Loctite 7457) | 26 | 27 | severe | slightly | + | 3 |
| | 28 | 12 | no | slightly | + | 2 |
| | 29 | 23 | no | slightly | + | 1 |
| | 30 | 10 | no | slightly | + | 0.5–1 |
| | 31 | 16 | no | slightly | + | 0.5–1 |
| | 32 | 12 | no | slightly | + | 0.5–1 |
| | 33 | 15 | no | slightly | + | 0.5–1 |
| | 34 | 26 | no | slightly | + | 2 |
| | 35 | 13 | no | slightly | + | 1 |
| | 36 | 11 | no | slightly | + | 0.5–1 |
| | 37 | 15 | no | slightly | + | 0.5–1 |

+ No skin formation with this adhesive; fillet cures from bottom to top.

Example 3

Four drops of CA-adhesive were placed as a bead or fillet on a sheet of black ABS-plastic, then a large excess, (6 drops), of CA-activator solution was added on top of the bead. The adhesive was left to cure without application of a second substrate. After evaporation of the solvent, the specimens were judged. The results are shown in the following table 9.

In case of post application of large quantities of n-heptane based CA-activators on top of CA-beads or fillets, the cured adhesive is often surrounded by a white area (white halo). See Nrs. 1; 2; 3; 5; 7; 9; 11.

A few percent of cyclohexanone added to the activator formulations successfully combats this effect. See Nos. 4; 6; 8; 10; 13; 14.

It seems that addition of 3% cyclohexanone is beneficial but not sufficient to obtain the full effect; see Nr. 12., but in the case of 5% and 7% (see Nrs. 13; 14) no white halo formation is observed (except: a slight whitening still remains in the case of adhesive Loctite 407, which is a slow curing adhesive and which in the batch tested had a low reactivity).

Despite cyclohexanone's pronounced solvent properties towards several plastics (e.g. ABS) the mixtures mentioned in the table were not found to cause swelling of the plastic (neither the black ABS, nor PMMA).

Example 4

Tests with other co-solvents like ethylacetate or acetone instead of cyclohexanone do not result in an attenuation of the white halo:

The tests were carried out in the same way as mentioned above in Example 3. The results are shown in Table 10. The activator solutions were 1.5% 3,5-DCP and 0.9% DPDS in solvent mixtures based on n-heptane with co-solvent; the concentration of co-solvent is expressed as percent by weight of the solvent mixture as mentioned in the left column.

TABLE 10

| Co-Solvent Concentration | Co-Solvent | Loctite 401 | Loctite 431 | Loctite LID-3692 | Sicomet 5195 |
|---|---|---|---|---|---|
| 3% | Ethyl acetate | h | hh | hh | hhh |
| 5% | Ethyl acetate | hhh | hhh | hh | hhh |
| 7% | Ethyl acetate | hhh | hhh | h | hhh |
| 3% | Acetone | hh | hhh | hh | hhh |
| 5% | Acetone | hhh | hhh | hh | hhh |
| 7% | Acetone | hh | hh | hh | hh |

Example 5

Further tests were conducted to compare cyclic ketones with linear ketones and cyclic ethers. As shown in Table 11, the results show that the cyclic ketones are effective in attenuating the white halo whereas the linear ketones and cyclic ethers tested are not.

TABLE 9

| Nr. | Activator | Solution | Loctite 401 | Loctite 407 | Loctite 410 | Loctite 431 | Loctite 460 | Loctite LID 3693 | Sicomet 5195 |
|---|---|---|---|---|---|---|---|---|---|
| 1 | Loctite 7455 | | hhh | hhh | hh | hhh | N | h | hh |
| 2 | Permabond CSA ativator | | h | hh | h | hh | N | hhh | N |
| 3 | 1% DMPT | in n-heptane | hhh | hhh | hh | hhh | N | h | hhh |
| 4 | 1% DMPT | in n-heptane/ 5% cyclohexanone | — | — | N | N | — | — | N |
| 5 | 0.4% DPDS | in n-heptane | hhh | hhh | hh | hh | h | hh | hhh |
| 6 | 0.4% DPDS | in n-heptane/ 5% cyclohexanone | — | — | N | N | — | — | N |
| 7 | 1.5% 3,5-DCP | in n-heptane | hhh | hhh | hh | hhh | N | hh | hh |
| 8 | 1.5% 3,5-DCP | in n-heptane/ 5% cyclohexanone | — | — | N | N | — | — | N |
| 9 | 0.95% DMPT; 0.09% DPDS | in n-heptane | hhh | hhh | hh | hh | h | hh | hhh |
| 10 | 0.95% DMPT, 0.09% DPDS | in n-heptane/ 5% cyclohexanone | N | hh | — | N | N | N | N |
| 11 | 1.5% 3,5-DCP, 0.09% DPDS | in n-heptane | hhh | hhh | hh | hhh | N | h | h |
| 12 | 1.5% 3,5-DCP, 0.09% DPDS | in n-heptane/ 3% cyclohexanone | hh | hh | hh | h | N | h | h |
| 13 | 1.5% 3,5-DCP, 0.09% DPDS | in n-heptane/ 5% cyclohexanone | h | h | N | N | N | N | N |
| 14 | 1.5% 3,5-DCP, 0.09% DPDS | in n-heptane/ 7% cyclohexanone | N | h | N | N | N | N | N |

Legend:
h slight white halo
hh white halo
hhh very strong white halo
N no halo

TABLE 11

| Nr. | Activator | | Loctite 401 | Loctite 406 | Loctite 480 | Sicomet 5195 |
|---|---|---|---|---|---|---|
| 1 | 1% DMPT | n-heptane/12% 1,4-dioxan | hhh | hhh | hh | hh |
| 2 | 1% DMPT | n-heptane/12% THF | hhh | hhh | hh | hh |
| 3 | 1% DMPT | n-heptane/6% butanone | hh | hhh | h | hh |
| 4 | 1% DMPT | n-heptane/12% butanone | hhh | hhh | hh | hh |
| 5 | 1% DMPT | n-heptane/16% butanone | hhh | hhh | hh | hhh |
| 6 | 1% DMPT | n-heptane/3% 3-pentanone | hhh | hhh | hh | hh |
| 7 | 1% DMPT | n-heptane/6% 3-pentanone | hhh | hhh | hhh | hh |
| 8 | 1% DMPT | n-heptane/8% 3-pentanone | hhh | hhh | hh | hhh |
| 9 | 1% DMPT | n-heptane/6% 2-hexanone | hh | hh | hh | h |
| 10 | 1% DMPT | n-heptane/6% 4-methyl-2-pentanone | hhh | hh | h | hh |
| 11 | 1% DMPT | n-heptane/12% 4-methyl-2-pentanone | hhh | hhh | hhh | hh |
| 12 | 1% DMPT | n-heptane/16% 4-methyl-2-pentanone | hhh | hhh | hhh | hh |
| 13 | 1% DMPT | n-heptane/6% 3-octanone | hh | hhh | hh | hh |
| 14 | 1% DMPT | n-heptane/12% cyclobutanone | N | N | N | N |
| 15 | 1% DMPT | n-heptane/3% cyclopentanone | hh | hhh | h | hh |
| 16 | 1% DMPT | n-heptane/6% cyclopentanone | N | h | N | N |
| 17 | 1% DMPT | n-heptane/12% cyclopentanone | hh | hhh | N | hh |
| 18 | 1% DMPT | n-heptane/3% cycloheptanone | N | h | N | N |
| 19 | 1% DMPT | n-heptane/6% cycloheptanone | N | N | N | N |
| 20 | 1% DMPT | n-heptane/8% cycloheptanone | N | N | N | N |
| 21 | 1% DMPT | n-heptane/6% 2-methyl cyclopentanone | h | N | N | N |
| 22 | 1% DMPT | n-heptane/12% 2-methyl cyclopentanone | N | h | h | N |
| 23 | 1.5% 3,5-DCP, 0.09% DPDS | n-heptane/12% 1,4-dioxan | hhh | hhh | hh | hh |
| 24 | 1.5% 3,5-DCP, 0.09% DPDS | n-heptane/12% THF | hhh | hhh | h | hh |
| 25 | 1.5% 3,5-DCP, 0.09% DPDS | n-heptane/6% butanone | hhh | hhh | hh | hh |
| 26 | 1.5% 3,5-DCP, 0.09% DPDS | n-heptane/12% butanone | hh | hhh | hh | hh |
| 27 | 1.5% 3,5-DCP, 0.09% DPDS | n-heptane/16% butanone | hhh | hhh | h | hhh |
| 28 | 1.5% 3,5-DCP, 0.09% DPDS | n-heptane/3% 3-pentanone | hhh | hhh | hh | hh |
| 29 | 1.5% 3,5-DCP, 0.09% DPDS | n-heptane/6% 3-pentanone | hh | hhh | hh | hh |
| 30 | 1.5% 3,5-DCP, 0.09% DPDS | n-heptane/8% 3-pentanone | hhh | hhh | h | hhh |
| 31 | 1.5% 3,5-DCP, 0.09% DPDS | n-heptane/6% 2-hexanone | hh | hhh | h | h |
| 32 | 1.5% 3,5-DCP, 0.09% DPDS | n-heptane/6% 4-methyl-2-pentanone | hhh | hhh | h | h |
| 33 | 1.5% 3,5-DCP, 0.09% DPDS | n-heptane/12% 4-methyl-2-pentanone | hhh | hhh | h | hh |
| 34 | 1.5% 3,5-DCP, 0.09% DPDS | n-heptane/16% 4-methyl-2-pentanone | hh | hhh | hh | hh |
| 35 | 1.5% 3,5-DCP, 0.09% DPDS | n-heptane/6% 3-octanone | hhh | hhh | h | hh |
| 36 | 1.5% 3,5-DCP, 0.09% DPDS | n-heptane/12% cyclobutanone | N | N | N | N |
| 37 | 1.5% 3,5-DCP, 0.09% DPDS | n-heptane/3% cyclopentanone | hh | hh | h | h |
| 38 | 1.5% 3,5-DCP, 0.09% DPDS | n-heptane/6% cyclopentanone | N | h | N | N |
| 39 | 1.5% 3,5-DCP, 0.09% DPDS | n-heptane/12% cyclopentanone | hh | hhh | h | h |
| 40 | 1.5% 3,5-DCP, 0.09% DPDS | n-heptane/3% cycloheptanone | h | N | N | N |
| 41 | 1.5% 3,5-DCP,0.09% DPDS | n-heptane/6% cycloheptanone | N | h | N | N |
| 42 | 1.5% 3,5-DCP, 0.09% DPDS | n-heptane/8% cycloheptanone | N | N | N | N |
| 43 | 1.5% 3,5-DCP, 0.09% DPDS | n-heptane/6% 2-methyl cyclopentanone | N | N | N | N |

TABLE 11-continued

| Nr. | Activator | | Loctite 401 | Loctite 406 | Loctite 480 | Sicomet 5195 |
|---|---|---|---|---|---|---|
| 44 | 1.5% 3,5-DCP, 0.09% DPDS | n-heptane/12% 2-methyl cyclopentanone | hh | hhh | N | N |

Legend:
h slight white halo
hh white halo
hhh very strong white halo
N no halo
— no data evaluated Comparative tests described above are carried out using commercially-available adhesive compositions but the individual nature of these adhesive compositions is not essential to the disclosure of the invention. The behaviour of activator solutions is to be compared within each test in relation to a particular adhesive composition and not from test to test in different adhesive compositions.

Although the invention has been described above, many modifications and equivalents thereof will be clear to those persons of ordinary skill in the art and are intended to be covered hereby, the true spirit and scope of the invention being defined by the claims.

What is claimed is:

1. An activator composition for accelerating hardening of cyanoacrylate adhesives, wherein the activator comprises a mixture of:
   (A) a member selected from the group consisting of: aromatic heterocyclic compounds having at least one N hetero atom in the ring(s) and substituted on the ring(s) with at least one electron-withdrawing group which decreases the base strength of the substituted compound compared to the corresponding unsubstituted compound, N,N-dimethyl-p-toluidine, and mixtures of any of the foregoing, with
   (B) an organic compound comprising the structural element, —N=C—S—S—.

2. A composition according to claim 1 wherein said organic compound (B) contains the structural element, —N=C—S—S—C=N.

3. A composition according to claim 2 wherein said organic compound (B) is selected from the group consisting of dibenzothiazyl disulfide, 6,6'-dithiodinicotinic acid, 2,2'-dipyridyl disulfide, and bis(4-t-butyl-1-isopropyl-2-imidazolyl)disulfide.

4. A composition according to claim 1 wherein the activator comprises a member (A) selected from the group consisting of pyridines, quinolines and pyrimidines substituted with at least one electron-withdrawing group which decreases the base strength of the substituted compound compared to the corresponding unsubstituted compound.

5. A composition according to claim 1 wherein the at least one electron-withdrawing group is selected from the group consisting of halo, CN, $CF_3$, COOR, $COR^4$, OR, SR, $CONR^3R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl.

6. A composition according to claim 5 wherein the electron-withdrawing group is selected from the group consisting of halo, CN, COOR and $COR^4$ wherein R or $R^4$ is $C_1$–$C_5$ alkyl.

7. A composition according to claim 1 wherein the activator comprises at least one member selected from the group consisting of 3,5-dihalopyridines, 3-cyano pyridine, lower alkyl 3,5-pyridine dicarboxylates, 5-halo pyrimidines, 2-acetyl pyridine, 5-halo nicotinic acids, 5-nitro quinoline, 4,7-dichloro quinoline and 2-acetyl pyridine.

8. A composition according to claim 7 wherein the 3,5-dihalopyridine is selected from the group consisting of 3,5-dichloropyridine or 3,5-dibromopyridine.

9. A composition according to claim 1 wherein the composition is a solution of the mixture of compounds in a solvent.

10. A composition according to claim 9 wherein the organic solvent is selected from the group consisting of volatile hydrocarbons, alcohols, carboxylic acid esters, ketones, ethers, halogenated hydrocarbons, ketals, acetals or carbonic acid esters is used as solvent for the mixture.

11. A composition according to claim 9 wherein the activator concentration is from 0.01 to 10 g of the mixture of compounds per 100 ml of solvent.

12. A composition according to claim 1 wherein the compounds are present in amounts of about 0.1% to about 10% by weight of (A) said aromatic heterocyclic compound and/or N,N-dimethyl-p-toluidine and about 0.01% to about 5% by weight of (B) said organic compound, based on the total weight of the composition.

13. An activator composition for accelerating hardening of cyanoacrylate adhesives, wherein the activator comprises a mixture of a 3,5-dihalopyridine and an organic compound comprising the structural element, —N=C—S—S—.

14. An activator composition according to claim 13 wherein the 3,5-dihalopyridine is selected from the group consisting of 3,5-dichloropyridine and 3.5-dibromopyridine.

15. An activator composition according to claim 13, wherein the activator compounds are present in amounts about 0.1% to about 10% by weight of the 3,5-dihalopyridine and about 0.01% to about 5% by weight of said organic compound, based on the total weight of the activator composition.

16. A composition comprising a mixture of 3,5-dihalopyridine and an organic compound comprising the structural element, —N=C—S—S—.

17. A composition according to claim 16 comprising a mixture of a 3,5-dihalopyridine and an organic compound having the structural element, —N=C—S—S—C=N— wherein the N=C and C=N double bonds are parts of aromatic heterocyclic rings.

18. A composition according to claim 16 comprising a mixture of 3,5-dichloropyridine and 2,2'-dipyridyl disulfide.

19. An activator composition for accelerating hardening of cyanoacrylate adhesives, wherein the activator comprises a member selected from the group consisting of:
   (A) aromatic heterocyclic compounds having at least one N hetero atom in the ring(s) and substituted on the ring(s) with at least one substituent selected from the group consisting of halo, CN, $CF_3$, COOR, $COR^4$, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl, mixtures of any of said aromatic heterocyclic compounds with each other, and/or with N,N-dimethyl-p-toluidine, and mixtures of any of said aromatic heterocyclic compounds and/or N,N-dimethyl-p-toluidine, with (B) an organic compound comprising the structural element, —N═C—S—S—.

20. A composition comprising a mixture of:
(A) a member selected from the group consisting of:
aromatic heterocyclic compounds having at least one N hetero atom in the ring(s) and substituted on the ring (s)with at least one substituent selected from the group consisting of halo, CN, $CF_3$, COOR, $COR^4$, OR, SR, $CONR^1R^2$, $NO_2$, SOR, $SO_2R^3$, $SO_3R^3$, $PO(OR^3)_2$ and optionally substituted $C_6$–$C_{20}$ aryl, wherein R, $R^1$, $R^2$ and $R^4$ (which may be the same or different) are H, optionally substituted $C_1$–$C_{10}$ alkyl, or optionally substituted $C_6$–$C_{20}$ aryl, and $R^3$ is optionally substituted $C_1$–$C_{10}$ alkyl, or optionally substituted $C_6$–$C_{20}$ aryl, N,N-dimethyl-p-toluidine, and mixtures of any of the foregoing.

21. Use of a composition according to claim 1 for accelerating hardening of a cyanoacrylate adhesive.

22. Use according to claim 21 wherein the composition is applied to a substrate before application of the cyanoacrylate adhesive thereto.

23. Use according to claim 21 wherein the composition is applied to the cyanoacrylate adhesive after application of the adhesive to a substrate.

24. An adhesive system comprising a cyanoacrylate adhesive together with a composition according to claim 1.

25. An adhesive system according to claim 24 wherein the composition is held separately from the adhesive prior to application on a substrate.

26. A process for the bonding of substrates or parts, characterized by either of the following series of process steps:
(a) dispensing an activator composition according to claim 1 onto at least one surface of the substrates or parts to be joined;
(b) optionally exposing solvent or other liquid vehicle in the activator composition to air, optionally with heating or with the aid of a fan;
(c) optionally retaining the substrate or part having the activator composition thereon for a retention or shipping period;
(d) applying a cyanoacrylate adhesive to at least one substrate or part;
(e) joining the substrates or parts, optionally with manual or mechanical fixing, and
(f) optionally subsequently dispensing the activator composition onto adhesive exposed from a joint gap; or
 (i) applying a cyanoacrylate adhesive onto at least one surface of the substrates or parts to be joined;
 (ii) joining the substrates or parts, optionally with manual or mechanical fixing;
 (iii) dispensing an activator composition according to claim 1 onto the adhesive before or after the step of joining the substrates or parts, and
 (iv) optionally exposing solvent or other liquid vehicle in the activator composition to air, optionally with heating or with the aid of a fan.

27. A bonded assembly of substrates or parts bonded by a process according to claim 26.

28. A substrate or part having a composition according to claim 1 applied thereto.

29. An activator composition for accelerating hardening of cyanoacrylate adhesives, wherein the composition comprises a solution of one or more activators in a solvent mixture which comprises a volatile hydrocarbon and a cyclic ketone.

30. A composition according to claim 29 wherein the cyclic ketone is present in an amount of up to about 15% by weight of the solvent mixture.

31. A composition according to claim 30 wherein the cyclic ketone is present in an amount of at least about 2.5% by weight of the solvent mixture.

32. A composition according to claim 31 wherein the cyclic ketone is present in an amount of at least about 3% by weight of the solvent mixture.

33. A composition according to claim 29 wherein the cyclic ketone is present in an amount in the range of 3% to 7.5% by weight of the solvent mixture.

34. A composition according to claim 33 wherein the cyclic ketone is present in an amount in the range of 4% to 7% by weight of the solvent mixture.

35. A composition according to claim 29 wherein the cyclic ketone is monocyclic or bicyclic.

36. A composition according to claim 29 wherein the cyclic ketone is an optionally-substituted cyclic ketone having 3–10 carbon atoms per ring.

37. A composition according to claim 36 wherein the cyclic ketone is mono- or di-substituted on the ring with $C_1$–$C_5$ alkyl.

38. A composition according to claim 29 wherein the cyclic ketone is an alicyclic ketone.

39. A composition according to claim 29 wherein the volatile hydrocarbon is an aliphatic hydrocarbon.

40. A composition according to claim 39 wherein the volatile aliphatic hydrocarbon is n-heptane.

41. A composition according to claim 29 wherein the activator is selected from the group consisting of:
organic amines including: lower fatty amines, aromatic amines, dimethylamine; aliphatic, alicyclic and tertiary aromatic amines; amine compounds with a boiling point of between 50° C. and 250° C.; organic compounds comprising the structural element, —N═C—S—S—; aromatic heterocyclic compounds having at least one N hetero atom in the ring(s) and substituted on the ring(s)with at least one electron-withdrawing group which decreases the base strength of the substituted compound compared to the corresponding unsubstituted compound, and mixtures of any of the foregoing with each other.

42. Use of an activator composition according to claim 29 for accelerating hardening of a cyanoacrylate adhesive.

43. Use according to claim 42 wherein the activator composition is applied to the cyanoacrylate adhesive after application of the adhesive to a substrate.

44. A process for the bonding of substrates or parts, comprising the following series of steps:
 (i) applying a cyanoacrylate adhesive onto at least one surface of the substrates or parts to be joined;
 (iii) joining the substrates or parts, optionally with manual or mechanical fixing;
 (iii) dispensing an activator composition according to claim 29 onto the adhesive before or after the step of joining the substrates or parts, and (iv) optionally exposing the solvent mixture in the activator composition to air, optionally with heating or with the aid of a fan.

45. A process according to claim 44 wherein at least one of the substrates or parts has a surface of a dark colour, or is transparent.

46. A process according to claim 44 wherein at least one of the substrates or parts is of a plastics material.

47. A bonded assembly of substrates or parts bonded by a process according to claim 44.

* * * * *

UNITED STATES PATENT AND TRADEMARK OFFICE
CERTIFICATE OF CORRECTION

PATENT NO. : 6,995,227 B2  
APPLICATION NO. : 10/276287  
DATED : February 7, 2006  
INVENTOR(S) : Ryan et al.

Page 1 of 1

It is certified that error appears in the above-identified patent and that said Letters Patent is hereby corrected as shown below:

Title page, (57) Abstract, line 14, delete "disulfide." and insert therefor --disulfide,--.

Column 3, line 41, delete "yprimidines" and insert therefor --pyrimidines--.

Column 8, line 63, delete "2-norbomanone" and insert therefor --2-norbornanone--.

Column 9, line 20, delete "N,N-dimethylo-toluidine" and insert therefor --N,N-dimethyl-o-toluidine--.

Column 12  
Line 26, delete "Reinforcing" and insert therefor --reinforcing--.  
Line 31, delete "polydi-alkylsiloxanes" and insert therefor --polydialkylsiloxanes--.

Column 14, line 35 before "trade mark" insert --registered--.

Column 34, line 46, delete "3.5-dibromopyridine" and insert therefor --3,5-dibromopyridine--.

Signed and Sealed this

Third Day of June, 2008

JON W. DUDAS  
*Director of the United States Patent and Trademark Office*